(12) United States Patent
Norton et al.

(10) Patent No.: US 11,441,996 B2
(45) Date of Patent: *Sep. 13, 2022

(54) FLOW CYTOMETERS HAVING ENCLOSED DROPLET SORTERS WITH CONTROLLED AEROSOL CONTENT AND METHODS OF USING THE SAME

(71) Applicant: Becton, Dickinson and Company, Franklin Lakes, NJ (US)

(72) Inventors: Pierce Norton, Los Gatos, CA (US); Kyle Dembski, Scotts Valley, CA (US); Henry Lankila, Livermore, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/101,319

(22) Filed: Nov. 23, 2020

(65) Prior Publication Data

US 2021/0109007 A1    Apr. 15, 2021

Related U.S. Application Data

(63) Continuation of application No. 16/390,742, filed on Apr. 22, 2019, now Pat. No. 10,914,671.

(Continued)

(51) Int. Cl.
*G01N 15/14* (2006.01)

(52) U.S. Cl.
CPC ... *G01N 15/1404* (2013.01); *G01N 2015/149* (2013.01); *G01N 2015/1493* (2013.01)

(58) Field of Classification Search
CPC ..... G01N 2015/149; G01N 2015/1406; G01N 2015/1081; G01N 2015/1409;

(Continued)

(56) References Cited

U.S. PATENT DOCUMENTS

| 3,989,381 A | 11/1976 | Fulwyler |
|---|---|---|
| 4,284,496 A | 8/1981 | Newton |

(Continued)

FOREIGN PATENT DOCUMENTS

| EP | 0672458 A2 | 9/1995 |
|---|---|---|
| EP | 1044262 A1 | 10/2000 |

(Continued)

OTHER PUBLICATIONS

Jayasinghe et al. "Sterile and Disposable Fluidic Subsystem Suitable for Clinical High Speed Fluorescence-Activated Cell Sorting", Cytometry Part B (Clinical Cytometry) 708:344-354 (2006).

(Continued)

*Primary Examiner* — Hoa Q Pham
(74) *Attorney, Agent, or Firm* — Peter W. Schroen; Bret E. Field; Bozicevic, Field & Francis LLP

(57) ABSTRACT

Flow cytometers having an enclosed particle sorting module are provided. Aspects of the flow cytometers include, in addition to the enclosed particle sorting modules, a sample input module fluidically coupled to an inlet of the enclosed particle sorting module, a waste reservoir fluidically coupled to first outlet of the enclosed particle sorting module and a first sorted particle collection system fluidically coupled to a second outlet of the enclosed particle sorting module. Flow cytometers as described herein are configured to control aerosol content in the enclosed particle sorting modules, including the sort chambers of such modules. Also provided are methods of using the flow cytometers, as well as kits that include one or more components of the flow cytometers are consumables for use therewith.

14 Claims, 6 Drawing Sheets

Related U.S. Application Data

(60) Provisional application No. 62/663,936, filed on Apr. 27, 2018.

(58) Field of Classification Search
CPC ....... G01N 2015/1481; G01N 15/1404; G01N 15/14; G01N 15/1436; G01N 15/1427
USPC ............ 356/335–343, 72, 73, 246, 440; 422/68.1, 82.05, 504, 577; 209/274, 576, 209/3.1
See application file for complete search history.

(56) References Cited

U.S. PATENT DOCUMENTS

| | | |
|---|---|---|
| D339,194 S | 9/1993 | Telang |
| 5,574,232 A | 11/1996 | Davidson |
| 5,641,457 A | 6/1997 | Vardanega |
| 5,776,781 A | 7/1998 | Vardanega et al. |
| 6,079,836 A | 6/2000 | Burr et al. |
| 6,372,506 B1 | 4/2002 | Norton et al. |
| 6,881,580 B2 | 4/2005 | Hall et al. |
| 7,153,475 B2 | 12/2006 | Hill |
| D676,567 S | 2/2013 | Van Den Engh |
| 8,455,258 B2 | 6/2013 | Quake et al. |
| 8,727,132 B2 | 5/2014 | Miltenyi et al. |
| 8,795,500 B2 | 8/2014 | Shinoda |
| D715,925 S | 10/2014 | Suzuki |
| D717,438 S | 11/2014 | Lin |
| 9,592,483 B2 | 3/2017 | Fox |
| D802,150 S | 11/2017 | Lund |
| 10,221,844 B2 | 3/2019 | Lofstrom |
| 10,508,990 B2 | 12/2019 | Fox |
| 10,914,671 B2 * | 2/2021 | Norton .............. G01N 15/1459 |
| 2004/0025602 A1 | 2/2004 | Norton |
| 2004/0062685 A1 | 4/2004 | Norton |
| 2004/0142463 A1 | 7/2004 | Walker et al. |
| 2005/0011582 A1 | 1/2005 | Haug |
| 2006/0118167 A1 | 6/2006 | Neas |
| 2009/0127167 A1 | 5/2009 | Kirstein et al. |
| 2011/0020855 A1 | 1/2011 | Shinoda et al. |
| 2011/0024615 A1 | 2/2011 | Tanner et al. |
| 2011/0137018 A1 | 6/2011 | Chabg-Yen et al. |
| 2011/0217723 A1 | 9/2011 | Durack |
| 2011/0259749 A1 | 10/2011 | Kanda |
| 2011/0271746 A1 | 11/2011 | Shinoda |
| 2011/0284378 A1 | 11/2011 | Shinoda |
| 2012/0164718 A1 | 6/2012 | Bishop et al. |
| 2012/0202237 A1 | 8/2012 | Sedoglavich |
| 2012/0276621 A1 | 11/2012 | Van Den Engh |
| 2013/0330739 A1 | 12/2013 | Yu |
| 2014/0078502 A1 | 3/2014 | Buchanan et al. |
| 2014/0120570 A1 | 5/2014 | Yu et al. |
| 2014/0170697 A1 | 6/2014 | Sharpe et al. |
| 2015/0050638 A1 | 2/2015 | Marquette |
| 2015/0330385 A1 | 11/2015 | Lofstrom et al. |
| 2016/0041082 A1 | 2/2016 | Van Den Engh |
| 2017/0299493 A1 | 10/2017 | Norton |
| 2018/0045636 A1 | 2/2018 | Avula et al. |

FOREIGN PATENT DOCUMENTS

| | | | |
|---|---|---|---|
| JP | 4-500008 A | | 1/1992 |
| JP | 2000-516345 A | | 12/2000 |
| JP | 2009154147 A | * | 7/2009 |
| WO | WO 90/04019 A1 | | 4/1990 |
| WO | WO 99/26067 A1 | | 5/1999 |
| WO | WO 2010/033140 A2 | | 3/2010 |
| WO | WO 2013119924 A1 | | 8/2013 |
| WO | WO2015053393 A1 | | 4/2015 |
| WO | WO2017191824 A1 | | 11/2017 |

OTHER PUBLICATIONS

Miltenyi Biotec GmbH, CliniMACS® Cell Separation Systems, Product Catalog 2008, 48 pages.

Miltenyi Biotec GmbH, CliniMACS® User Manual, US Edition, Software 2.40, Jan. 2014, 128 pages.

Miltenyi Biotec GmbH, CliniMACS® User Manual for the CliniMACS® CD34 Reagent System, Jan. 2014, 102 pages.

Sandin et al. "Magnetophoresis and cytometry with magnetic microparticles", International Congress Series, Jun. 2007, vol. 1300, pp. 271-274.

Yang et al. "Micro flow cytometry utilizing a magnetic bead-based immunoassay for rapid virus detection", Biosensors and Bioelectronics, Dec. 1, 2008, vol. 24, No. 4, pp. 855-862.

* cited by examiner

FLOW CYTOMETERS HAVING ENCLOSED DROPLET SORTERS WITH CONTROLLED AEROSOL CONTENT AND METHODS OF USING THE SAME

CROSS-REFERENCE TO RELATED APPLICATION

Pursuant to 35 U.S.C. § 119(e), this application claims priority to the filing date of U.S. Provisional Patent Application Ser. No. 62/663,936, filed Apr. 27, 2018; the disclosure of which application is incorporated herein by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

One type of flow-type particle sorting system is the electrostatic sorting type. In an electrostatic sorter, a fluid suspension is jetted from a nozzle and vibrated to break the stream into uniform discrete drops. The sorting mechanism includes a drop charging means connected to the stream to charge drops containing a particle of the type to be sorted with an electrical charge as it breaks off from the jet stream. The stream of drops is passed through a transverse electrostatic field established by a pair of oppositely charged deflection plates. Charged drops containing a particle of the type to be sorted are deflected in a direction and in an amount related to the polarity and magnitude of the drop charge and are collected in distinct collection receptacles. Uncharged drops are not deflected passing through the electrostatic field and are collected by a central receptacle.

SUMMARY

Flow cytometers having an enclosed particle sorting module are provided. Aspects of the flow cytometers include, in addition to the enclosed particle sorting modules, a sample input module fluidically coupled to an inlet of the enclosed particle sorting module, a waste reservoir fluidically coupled to first outlet of the enclosed particle sorting module and a first sorted particle collection system fluidically coupled to a second outlet of the enclosed particle sorting module. Flow cytometers as described herein are configured to control aerosol content in the enclosed particle sorting modules, including the sort chambers of such modules. Also provided are methods of using the flow cytometers, as well as kits that include one or more components of the flow cytometers are consumables for use therewith.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
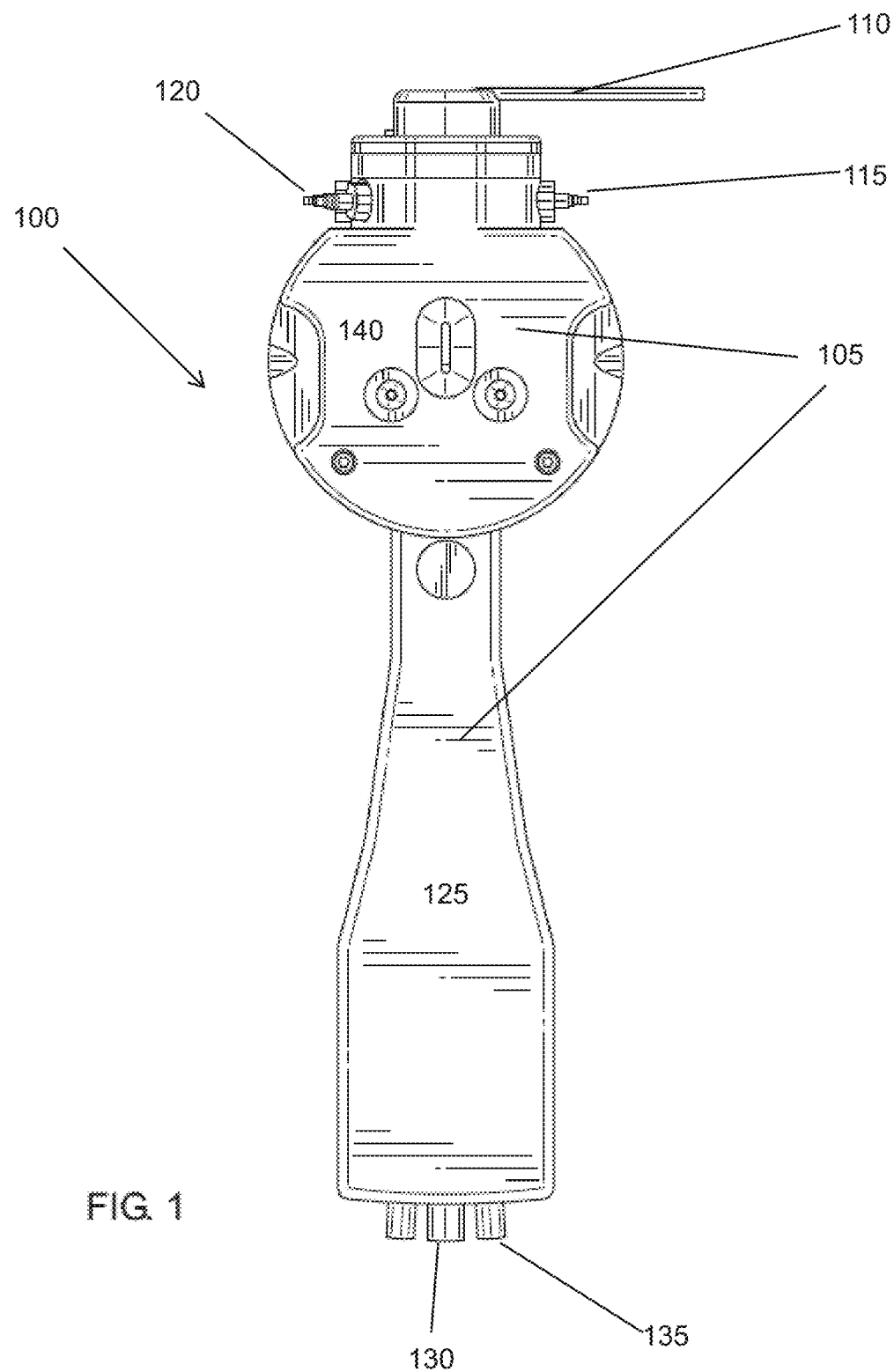
FIG. 1 provides an illustration of an enclosed particle sorting module in accordance with an embodiment of the invention.

Flow cytometers having an enclosed particle sorting module are provided. Aspects of the flow cytometers include, in addition to the enclosed particle sorting modules, a sample input module fluidically coupled to an inlet of the enclosed particle sorting module, a waste reservoir fluidically coupled to first outlet of the enclosed particle sorting module and a first sorted particle collection system fluidically coupled to a second outlet of the enclosed particle sorting module. Flow cytometers as described herein are configured to control aerosol content in the enclosed particle sorting modules, including the sort chambers of such modules. Also provided are methods of using the flow cytometers, as well as kits that include one or more components of the flow cytometers are consumables for use therewith.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometers

As reviewed above, flow cytometers having enclosed particle sorting modules are provided. Flow cytometers as described herein include flow cytometer systems and enclosed particle sorting modules that may be operably coupled thereto. In some instances, the flow cytometer systems and the enclosed particle sorting modules are configured such that the enclosed particle sorting module may be readily operably engaged with and removed from the flow cytometer system. Each of these components of the flow cytometers of the invention are described in detail further below.

Aspects of the flow cytometers is that they are configured to control aerosol content in the enclosed particle sorting modules, such as in the sort chambers thereof. The inventors have discovered that in enclosed particle sorting modules, such as those of the present flow cytometers, aerosols tend to form in the sort chambers which can cause problems with respect to functionality of the sort modules, e.g., arcing of deflection plates, liquid contamination of sensitive components, etc. Embodiments of the invention remediate these issues by controlling the aerosol content in the enclosed particle sorting modules, such as in the sort chambers of the enclosed particle sorting modules. In some instances, controlling the aerosol content is meant that the amount of aerosol droplets, if present, in the sort chamber is less than would results in one or more of the problems discussed above, e.g., arcing. In some instances, the aerosol content is controlled such that it does not exceed a detectable amount. Aerosol content is controlled in flow cytometers of the invention using one or more distinct approaches, e.g., as described in greater detail below.

Enclosed Particle Sorting Modules

As indicated above, the flow cytometers of the invention include enclosed particle sorting modules for sorting components of a liquid sample, such as cells in a biological sample. The term "sorting" is used herein in its conventional sense to refer to separating components (e.g., cells, non-cellular particles such as biological macromolecules) of the sample and in some instances, as described below, delivering the separated components to a receiving location, e.g., of a container or collection system, such as described below in greater detail. For example, the subject particle sorting modules may be configured for sorting a single component from the remaining constituents of a sample, or for sorting samples having 2 or more components, such as 3 or more components, such as 4 or more components, such as 5 or more components, such as 10 or more component, such as 15 or more components and including soring a sample having 25 or more components. One or more of the sample components may be separated from the sample and delivered to a container, such as 2 or more sample components, such as 3 or more sample components, such as 4 or more sample components, such as 5 or more sample components, such as 10 or more sample components and including 15 or more sample components may be separated from the sample and delivered to a container at the receiving location.

In embodiments, particle sorting modules include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. The term "enclosed" is meant that each component of the particle sorting module is fully contained within the housing and the components are sealed off or isolated from the ambient environment. In other words, the components within the enclosed housing are not exposed to or have no contact with the outside environment. In some embodiments, the components contained within the housing are isolated from the gaseous environment of the ambient environment (i.e., are not exposed to the gases outside of the housing). In other embodiments, the components contained within the housing are isolated from the fluidic environment of the ambient environment (i.e., are not exposed to any fluids present outside of the housing). In yet other embodiments, the components contained within the housing are sterile and are isolated from live bacteria or other microorganisms that are present in the ambient environment (i.e., sterile).

Particle sorting modules of interest are configured to be coupled to a particle sorting system of a flow cytometer where a stream of droplets is produced in the particle sorting module and passed substantially one at a time through a sample interrogation region where the particles are detected and identified. Droplet deflectors are positioned downstream from the sample interrogation region, e.g., in a sort chamber, and are configured to deflect the analyzed droplets through different outlets, e.g., through a first outlet coupled to a waste reservoir or a second outlet coupled to a sorted particle receiver, e.g., a container or a sorted particle collection system, such as described in greater detail below.

Particle sorting modules may include an enclosed housing having an aligner for coupling the housing with a particle sorting system of a flow cytometer, a flow cell nozzle positioned at the proximal end of the housing, a sample interrogation region in fluid communication with the orifice of the flow cell nozzle and a droplet deflector, e.g., on a sort chamber of the module. In some instances, the housing has a distal end and a proximal end with walls therebetween that together form an inner chamber. In embodiments, one or more of the outer walls of the housing have aligners for coupling the housing to a particle sorting system of a flow cytometer. For example, the housing may have 2 or more walls having aligners for coupling the housing to a particle sorting system, such as 3 or more walls and including 4 or more walls having aligners. In certain embodiments, the housing has one wall having aligners for coupling the housing to a particle sorting system. Each wall having an aligner may include 1 or more aligner, such as 2 or more aligners, such as 3 or more aligners, such as 4 or more aligners, such as 5 or more aligners, such as 7 or more aligners and including 10 or more aligners. In certain embodiments, the particle sorting device includes an outer wall with 3 aligners.

Any suitable type of aligner may be employed, such as an alignment protrusion, an alignment rail, an alignment notch, an alignment groove, an alignment slot, an alignment countersink, an alignment counter-bore, an alignment recess, an alignment hole or a combination thereof. For example, in some instances an outer wall of the housing includes one or more protrusions, such as a pin, a dowel or a bump. In certain embodiments, the aligner is a pin, such as a ball tipped pin. In other instances, an outer wall of the housing includes one or more recesses, such as a hole or a notch. In certain instances, an outer wall of the housing includes one or more alignment protrusions and one or more alignment recesses. Further details regarding aligners and enclosed particle sorting modules including the same are described in U.S. application Ser. No. 15/472,020 published as US 2017-0299493; the disclosure of which is herein incorporated by reference.

In some embodiments, the outer wall of the housing of the particle sorting modules includes one or more electrical connections configured for electrical connectivity between the particle sorting module and the particle sorting system. For example, the outer housing may include 2 or more electrical connections, such as 3 or more electrical connections, such as 4 or more electrical connections, such as 5 or more electrical connections and including 10 or more electrical connections. The electrical connection, in some embodiments, provides power to the droplet deflector plates. Any convenient electrical connection may be employed, such as conductive pins, pads, wires or coils which protrude or are recessed within the outer walls of the housing. In certain embodiments, particle sorting modules of interest include 5 or more electrical pins. Further details regarding electrical connections and enclosed particle sorting modules including the same are described in U.S. application Ser. No. 15/472,020 published as US 2017-0299493; the disclosure of which is herein incorporated by reference.

The size of the particle sorting module housing may vary having a length that ranges from 10 cm to 100 cm, such as from 15 cm to 95 cm, such as from 20 cm to 90 cm, such as from 25 cm to 85 cm, such as from 30 cm to 80 cm, such as from 35 cm to 75 cm and including from 40 cm to 60 cm. The width of the particle sorting module housing may range from 1 cm to 25 cm, such as from 2 cm to 20 cm, such as from 3 cm to 15 cm and including from 5 cm to 10 cm.

The housing may be formed from any suitable material that is compatible with a fluidic sample (e.g., biological sample), including metal, glass (e.g., Pyrex glass, borosilicate glass), ceramic or plastic. In certain embodiments, the particle sorting module housing is formed from a plastic, such as a rigid plastic, polymeric or thermoplastic material. For example, suitable plastics may include, but are not limited to polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the particle sorting module housing is formed from a polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc.

As summarized above, the enclosed particle sorting module includes a flow cell nozzle having an orifice positioned at the proximal end of the housing. Any convenient flow cell nozzle which propagates a fluidic sample to a sample interrogation region may be employed, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, where in some instances the rate of sample conveyed to the flow cell nozzle chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The enclosed particle sorting module also includes a sample interrogation region in fluid communication with the flow cell nozzle orifice. As described in greater detail below, a sample flow stream emanates from an orifice at the distal end of the flow cell nozzle and particles in the flow stream may be irradiated with a light source at the sample interrogation region of the particle sorting module. The size of the interrogation region of the particle sorting module may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more of the particle sorting module.

The interrogation region on the particle sorting module may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region on the particle sorting module includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region of the particle sorting module may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the particle sorting module at the interrogation region may be formed from any transparent material which passes the desired range of wavelength, including but not limited to optical glass, borosilicate glass, Pyrex glass, ultraviolet quartz, infrared quartz, sapphire as well as plastic, such as any of the polymeric plastic material used to form the housing as described above.

In some embodiments, particle sorting modules of interest include a cuvette positioned in the sample interrogation region. In some instances, the cuvette is affixed within the particle sorting module at the sample interrogation region, such as with an adhesive or mechanically held in place, e.g., with a clip or screw. In other instances, the cuvette is co-molded with the particle sorting module at the sample interrogation region. In certain instances, the cuvette is incorporated directly into the particle sorting module. The cuvette may be formed from any transparent material which passes the desired range of wavelength, including but not limited to optical glass, borosilicate glass, Pyrex glass, ultraviolet quartz, infrared quartz, sapphire as well as a plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly (ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly ([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the sample interrogation region includes one or more optical adjustment components. By "optical adjustment" is meant that light irradiated onto the sample interrogation region or light collected from an irradiated flow stream is changed as desired. In some embodiments, the sample interrogation region includes an optical adjustment component for adjusting the light irradiated onto the sample interrogation region by a light source. In other embodiments, the sample interrogation region includes an optical adjustment component for adjusting light emanating from an irradiated flow stream before being conveyed to a detector for measurement. In yet other embodiments, the sample interrogation region includes an optical adjustment component for adjusting both the light irradiated onto the sample interrogation region by a light source and the light emanating from an irradiated flow stream before being conveyed to a detector for measurement. For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the collected light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam.

Optical adjustment components may be any convenient device or structure which provides the desired change in the collected light and may include, but is not limited to, lenses, mirrors, pinholes, slits, gratings, light refractors, and any combinations thereof. The particle sorting module may include one or more optical adjustment components at the sample interrogation region as needed, such as two or more, such as three or more, such as four or more and including five or more optical adjustment components.

Where the particle sorting module includes one or more optical adjustment components at the sample interrogation region, the optical adjustment component may be physically coupled to the particle sorting module, such as with an adhesive, co-molded to the housing or integrated directly into the particle sorting module housing with the optical adjustment component positioned at the sample interrogation region. As such, the optical adjustment component and the particle sorting module may be integrated into a single unit.

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest which may be a part of or combined with the subject flow cell nozzles, include but are not limited to, colored glass, bandpass filters, interference filters, dichroic mirrors, diffraction gratings, monochromators and combinations thereof, among other wavelength separating protocols. In some embodiments, the wavelength separator is an optical filter. For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

Figure 4:
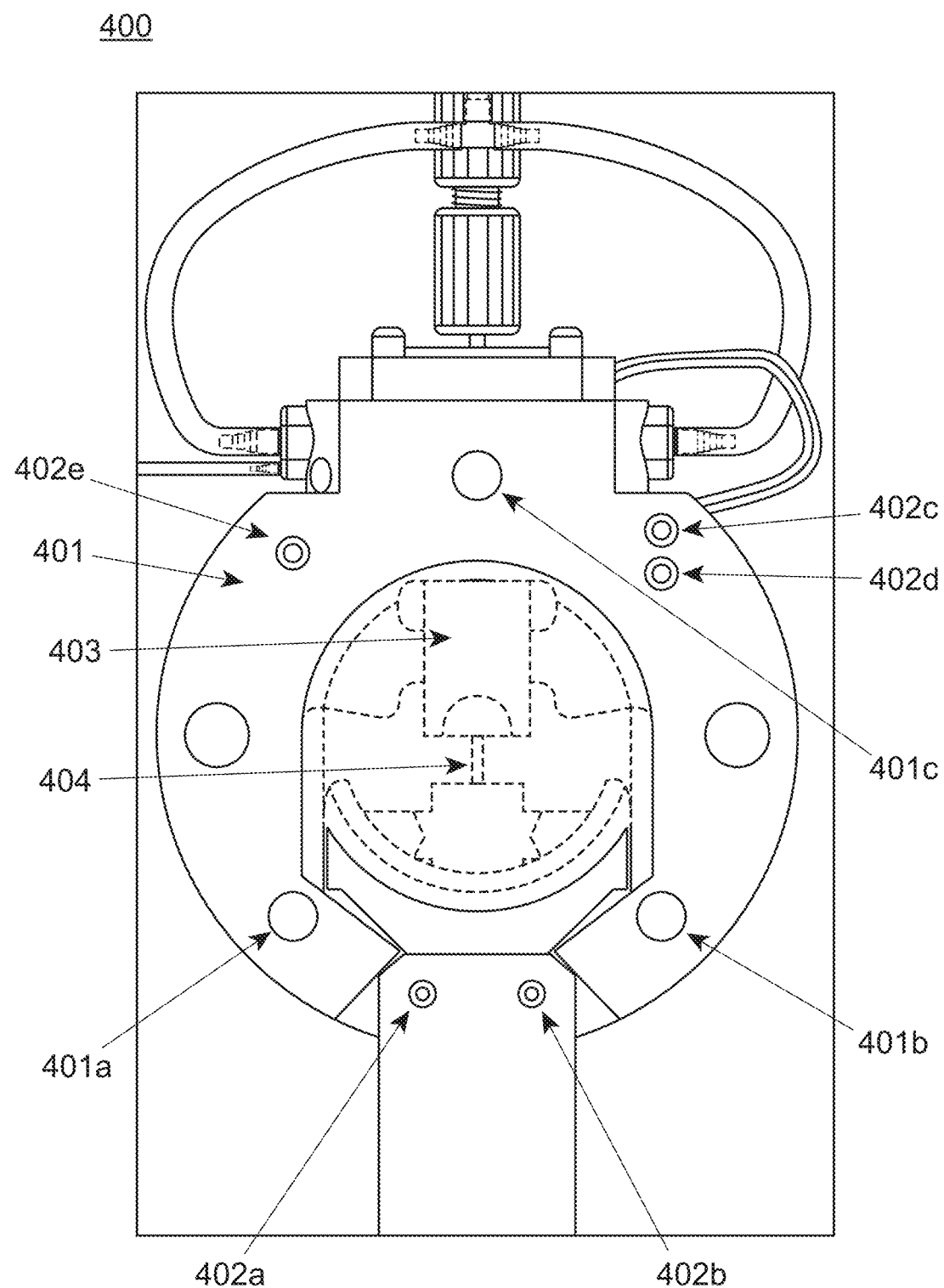
FIG. 4 depicts a side view of a particle sorting module housing according to certain embodiments.

FIG. 4 depicts a side view of a particle sorting module housing according to certain embodiments. Particle sorting module 400 includes outer wall 401 having three ball tipped pin protrusion aligners 401a, 401b and 401c that are positioned equidistantly from each other and equidistantly from the center of circular-shaped outer wall 401. Outer wall 401 also includes five electrical connector pins 402a, 402b, 402c, 402d and 402e configured to provide an electrical connection (e.g., power) to the particle sorting module (e.g., droplet deflector plates). Particle sorting module 400 also includes flow cell nozzle 403 in fluid communication with a sample input module and sample interrogation region 404 downstream from flow cell nozzle 403.

In embodiments, particle sorting modules also include a droplet deflector that is configured to divert droplets containing analyzed cells to a receiving location, e.g., an outlet operably coupled to a container or a sorted particle collection system, from a stream of droplets produced from the flow stream emanating from the flow nozzle. Diverted droplets may be referred to here as sorted droplets. Diversion of a droplet of interest to a receiving location may be achieved by droplet deflector via electrostatic charging of the droplet and deflection of the charged droplet from the flow stream by the application of an electrostatic field. Such electrostatic fields may be created by deflector plates positioned adjacent to the flow stream. As used herein, the terms "deflection" or "deflected" refer to the electrostatic deflection of droplets of interest from an analyzed flow stream of droplets, such that the cells may be identified and tracked in the flow stream and only those droplets of the flow stream that include those cells of interest are diverted and collected by a container. In some instances, the particle sorting module includes droplet deflects that are configured to deflect a single droplet into each container.

The particle sorting module is configured to produce an analyzed stream of droplets and deflect each analyzed droplet from the stream of analyzed droplets to a deflected droplet receiving location. As used herein, the term "deflected droplet receiving location" refers to a location downstream from the droplet deflectors where a sorted droplet containing a cell of interest may be collected after it has been deflected by the droplet deflector plates. The subject particle sorting modules may have two or more deflector plates, as desired, such as 3 or more, such as 4 or more, such as 5 or more, such as 6 or more, such as 7 or more, such as 8 or more, such as 9 or more and including 10 or more deflector plates.

Figure 5:
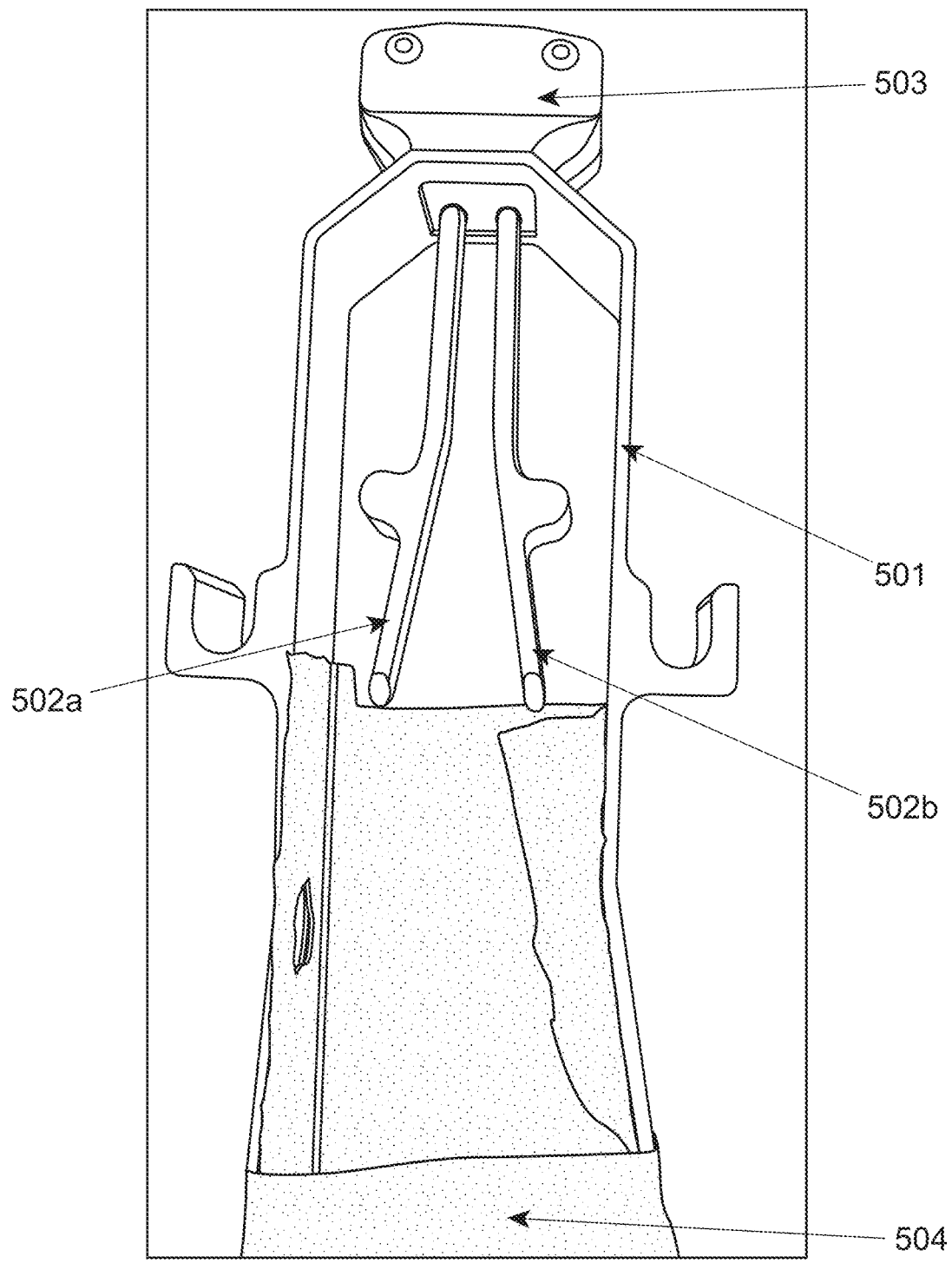
FIG. 5 depicts droplet deflector plates positioned inside of a particle sorting module according to certain embodiments.

FIG. 5 depicts droplet deflector plates positioned inside of a particle sorting module according to certain embodiments. Particle sorting module 500 includes a housing 501. Droplet deflector plates 502a and 502b are positioned inside of housing 501 and are configured to deflect particle droplets from a flow stream emanating from the proximal end 503 of housing 501 and diverting the droplets to one or more containers positioned at distal end 504 of housing 501.

Particles in the flow stream may be deflected by any convenient deflector plate protocol, including but not limited to cell sorting deflector plates as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference in their entirety. In certain embodiments, the deflector plates include charged plates for sorting cells in the flow stream as used in flow cytometry systems such as the BD Biosciences Influx™ cell sorter, BD Biosciences FACSAria™ III and BD FACSAria™ Fusion cell sorters, BD Biosciences FACSJazz™ cell sorter, the BD Biosciences FACSMelody™ cell sorter, and the like.

Deflector plates in particle sorting modules of interest may be configured based on the type of cells being sorted, the rate of sorting, the applied voltage to the cells as well as the number of components being sorted in the sample. In embodiments, the length of suitable deflector plates may range from 5 mm to 100 mm, such as from 6 mm to 90 mm, such as from 7 mm to 80 mm, such as from 8 mm to 70 mm, such as from 9 mm to 60 mm and including from 10 mm to 50 mm. The width of the deflector plates may vary, ranging from 1 mm to 25 mm, such as from 2 mm to 20 mm, such as from 3 mm to 15 mm and including from 5 mm to 10 mm. The distance between each deflector plate may vary depending on the applied voltage as well as the size of the particles being sorted in the flow stream. In some embodiments, the distance between each deflector plate may be 1 mm or more, such as 2 mm or more, such as 3 mm or more, such as 4 mm or more, such as 5 mm or more and including 10 mm or more. For example, the distance between each deflector plate may range from 1 mm to 25 mm, such as from 2 mm to 22.5 mm, such as from 3 mm to 20 mm, such as from 4 mm to 17.5 mm and including from 5 mm to 15 mm. The deflector plates may also be oriented at an angle to each other, such as an angle from 15° to 75°, such as from 20° to 70°, such as from 25° to 65° and including at an angle of from 30° to 60°.

The voltage applied to deflector plates to divert charged particles (as described in greater detail below) may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more and including 10000 mV or more. In certain embodiments, the applied voltage to the deflector plates ranges from 0.001 V to 6000 V, including 0.001 V to 5000 V, such as from 0.01 V to 4000 V, such as from 0.1 V to 3000 V, such as from 1 V to 2000 V, such as from 5 V to 1500 V, such as from 10 V to 1000 V, such as from 25 V to 750 V and including from 100 V to 500 V.

The deflection plates are configured to divert particles from the flow stream to a receiving location downstream from the deflection plates, e.g., one of two or more different outlets of the sort chamber, such as a first waste outlet or a second sorted particle outlet. In embodiments, the deflection plates may divert each particle by an angle that varies. In some embodiments, the deflection plates are configured to deflect each particle by an angle of 0.5 degrees or more from the longitudinal axis of the flow stream, such as 1 degree or more, such as 1.5 degrees or more, such as 2 degrees or more, such as 2.5 degrees of more, such as 3 degrees or more, such as 5 degrees or more, such as 7.5 degrees or more and including deflecting each particle by an angle of 10 degrees or more from the longitudinal axis of the flow stream. For example, each particle may be diverted from the longitudinal axis of the flow stream by an angle from 0.1 degrees to 30 degrees, such as from 0.5 degrees to 25 degrees, such as from 1 degree to 20 degrees, such as from 2 degrees to 15 degrees and including from 5 degrees to 10 degrees.

In some embodiments, the distal end of the subject particle sorting modules is configured for coupling to one or more containers for collecting the deflected particle droplets from the flow stream. For example, the distal end of the particle sorting modules may be configured for coupling to 1 or more containers, such as 2 or more containers, such as 3 or more containers, such as 4 or more containers, such as 5 or more containers, such as 6 or more containers, such as 10 or more containers and including 25 or more containers, e.g., via an outlet of the housing. In some instances, the distal end of the housing may include one or more aligners for coupling the housing to a container. Suitable aligners for coupling the distal end of the housing to a container may include but are not limited to an alignment protrusion, an alignment rail, an alignment notch, an alignment groove, an alignment slot, an alignment countersink, an alignment counter-bore, an alignment recess, an alignment hole or a combination thereof. In some embodiments, the distal end of the housing also includes one or more fasteners for attaching the container to the distal end of the housing. Suitable fasteners may include, but are not limited to magnets, hook and loop fasteners, latches, notches, grooves, pins, tethers, hinges, Velcro, non-permanent adhesives or a combination thereof. In certain embodiments the distal end of the housing includes a screw-thread for coupling a container by screw-threading the container to the housing.

In certain embodiments, the particle sorting module includes one or more containers at the distal end of the housing that receive the deflected particle droplets from the flow stream. For example, the particle sorting device, according to these embodiments may include 2 or more containers, such as 3 or more containers, such as 4 or more containers, such as 5 or more containers, such as 6 or more containers, such as 10 or more containers. In some embodiments, the container is mechanically coupled to distal end of the housing such as by a luer-lok connection, a sterile tube weld or by being screw threaded to the housing. In other embodiments, the container is affixed to the distal end of the housing by a permanent or non-permanent adhesive. In still other embodiments, the container is co-molded with the particle sorting module housing. In yet other embodiments, the container is integrated together with the housing, such that the container and housing form a single unit. In yet other instances, the container may be fluidically coupled to the housing, e.g., via tubing configured to convey sorted droplets, where such embodiments may provide for sterile retrieval of sorted droplets, e.g., by pinching and cutting the fluid conveyance structure, e.g., tubing. Suitable containers for collecting droplets from the flow stream may include, but are not limited to, test tubes, conical tubes, multi-compartment containers such as microtiter plates (e.g., 96-well plates), centrifuge tubes, culture tubes, microtubes, caps, cuvettes, bottles, rectilinear polymeric containers, and bags, among other types of containers.

Figure 6:
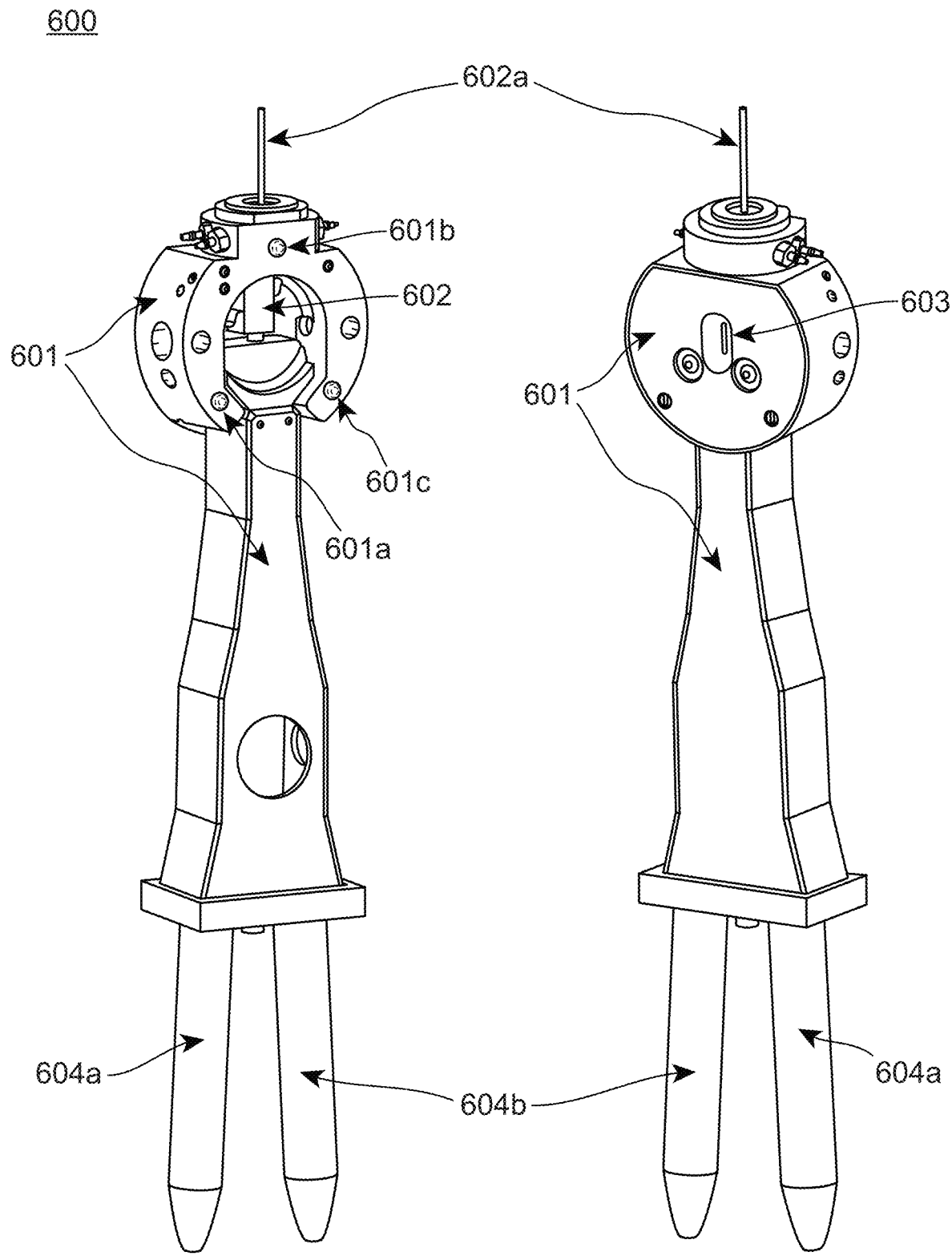
FIG. 6 depicts a particle sorting module coupled to two containers according to certain embodiments.

FIG. 6 depicts a particle sorting module coupled to two containers according to certain embodiments. Particle sorting module 600 includes a housing having outer walls 601 with aligners 601a, 601b and 601c configured for coupling the particle sorting module to a particle sorting system. Particle sorting module 600 also includes a flow nozzle 602 with sample inlet 602a which is in fluid communication with a sample interrogation region 603. Downstream from sample interrogation region 603 are droplet deflector plates (not shown) that divert particle droplets from the flow stream emanating from the flow nozzle. Droplets are collected at the distal end of housing with containers 604a and 604b that are coupled to the particle sorting module (e.g., by screw threading the containers to the distal end of the housing).

Also of interest as containers are pliant sample containers, such as bags, e.g., sterile bags. By pliant is meant that the sample container may be bent or flexed from its original shape without any significant structural changes, such as tearing, cracking, perforating, etc. For example, a pliant sample container may be flexed and/or deformed from its original shape, while still maintaining a sealed barrier preventing contact between a fluid inside the sample container and the surrounding environment. In some cases, the pliant sample container is made from a flexible material that has a Young's modulus of 1 GPa or less, such as 0.7 GPa or less, including 0.5 GPa or less, for instance, 0.3 GPa or less, or 0.1 GPa or less, such as 0.05 GPa or less, or 0.01 GPa or less. In certain embodiments, the fluid in the pliant sample container is sterile, i.e., free or substantially free from live bacteria or other microorganisms. In certain embodiments, a buffer may be contained within a container, such as a cryocontainer. Containers of interest include containers that are Ethinyl Vinyl Acetate (EVA) based, such as EVA freezing bag, such as a CRYOCTYTE™ freezing bag (Baxter Healthcare Corporation, Deerfield, Ill.), CELL-FREEZE® cryogenic freezing bag (Charter Medical, Winston-Salem, N.C.), ORiGEN CRYOSTORE™ freezing bag (OriGen BioMedical, Austin, Tex.), and the like.

Further details regarding containers and enclosed particle sorting modules including the same are described in U.S. application Ser. No. 15/472,020 published as US 2017-0299493; the disclosure of which is herein incorporated by reference.

In some instances the container is a sorted particle collection system which includes a collection container having a sort tube in droplet receiving relationship with an outlet of the enclosed particle sorting module; and a sample output operatively coupling a cell collection location of the collection container to a mating connection for an evacuated receiving container, such as a VACUTAINER® blood collection tube. Further details regarding such sorted particle collection systems are described in U.S. Application Ser. No. 62/663,792 filed on Apr. 27, 2018 as well as U.S. patent application Ser. No. 16/390,376 filed on Apr. 22, 2019 that claims priority thereto; the disclosure of which is herein incorporated by reference.

Any of the fluidic connections with respect to the sorting module, e.g., within the sorting module and/or between the sorting module and other aspects of the systems, e.g., receiving containers (such as bags), input tubes, etc., may be made using sterile tube welding, as desired. Any convenient sterile tube welding system and materials may be employed.

FIG. 1 provides an illustration of an enclosed particle sorting module in accordance with an embodiment of the invention. As illustrated in FIG. 1, enclosed particle sorting module 100 includes housing 105 which encloses the disparate components of the sorting module, such as the sample interrogation region 140 and the sort chamber 125. Located at the top or proximal end of the sorting module is sample input 110. Also shown are sheath fluid input 120 and waste reservoir connector 115. At the bottom of the module and providing exits for the sort chamber are waste exit port 130 and sorted particle exit port 135.

Flow Cytometer Systems

As reviewed above, aspects of the present disclosure also include flow cytometer systems with which the enclosed particle sorting modules may be operably engaged to produce a flow cytometer that is configured for sorting particle components of a sample, such as cells in a biological sample, i.e., a cell sorter flow cytometer. Systems according to certain embodiments include one or more enclosed particle sorting modules, e.g., as described above, a sample input module fluidically coupled to an inlet at the proximal end of the particle sorting module and a waste reservoir, e.g., tank or other vessel, fluidically coupled to an outlet from the particle sorting module. In embodiments, the system is configured to be coupled with one or more of the enclosed particle sorting modules described above. To connect the particle sorting module, the system may include a register configured for coupling with the aligners on the housing of the particle sorting module. The register may include one or more aligners that are complimentary to the aligners on the housing of the particle sorting system. For example, the register may include 2 or more aligners, such as 3 or more aligners, such as 4 or more aligners, such as 5 or more aligners, such as 7 or more aligners and including 10 or more aligners. In certain embodiments, the particle sorting system register includes 3 aligners. Further details regarding aligners and flow cytometer systems including the same are described in U.S. application Ser. No. 15/472,020 published as US 2017-0299493; the disclosure of which is herein incorporated by reference.

As summarized above, systems also include a sample input module fluidically coupled to an inlet at the proximal end of the particle sorting module. In embodiments, the sample input module is configured to provide a suitable flow of sample to the flow cell nozzle chamber in the particle sorting module. Depending on the desired characteristics of the flow stream emanating from the flow nozzle, the rate of sample conveyed to the particle sorting module by the sample input module may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, wherein in some instances the flow rate is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

In embodiments, the sample fluid input includes a container, a cap and one or more ports into the interior cavity of the container. The container has a distal end and a proximal end with walls between the distal end and proximal end that together form an inner cavity within the container. In some embodiments, the outer walls of the container and inner cavity have the same cross-sectional shape where cross-sectional shapes of interest include, but are not limited to curvilinear cross-sectional shapes, e.g., circles, ovals, rectilinear cross sectional shapes, e.g., squares, rectangles, trapezoids, triangles, hexagons, etc., as well as irregular shapes, e.g., a parabolic bottom portion coupled to a planar top portion. For example, both the outer walls of the container and the inner cavity may have circular or oval cross sections or both the outer walls of the container and the inner cavity may have polygonal (e.g., octagonal) cross sections. In other embodiments, the outer walls and inner cavity of the container have different cross-sectional shapes (e.g., container having a polygonal cross-section and inner chamber having a circular cross-section). In certain embodiments, the container is a tube and the cross-sectional shape the outer walls and the inner walls are both circular.

The size of the inner cavity of the container may vary depending on the sample size and size of particle sorting module, where in some instances the length of the inner cavity of the container may range from 1 cm to 25 cm, such as from 2.5 cm to 22.5 cm, such as from 5 cm to 20 cm, such as from 7.5 cm to 17.5 cm and including from 10 cm to 15 cm and the width of the inner cavity of the container may range from 1 cm to 20 cm, such as from 2 cm to 17.5 cm, such as from 3 cm to 15 cm, such as from 4 cm to 12.5 cm and including from 5 cm to 10 cm. Where the inner cavity of the container has a cylindrical cross-section, the diameter may vary, in some embodiments, ranging from 1 cm to 10 cm, such as from 2 cm to 9 cm, such as from 3 cm to 8 cm and including from 4 cm to 7 cm. Accordingly, the volume of the container may vary, ranging from 1 to 500 cm$^3$, such as 5 to 250 cm$^3$, such as 10 to 200 cm$^3$, such as 15 to 150 cm$^3$, such as 20 to 125 cm$^3$ and including from 25 to 100 cm$^3$. In some embodiments, the container of the sample input module is a tube having a volume ranging from 1 mL to 500 mL, such as from 2 mL to 400 mL, such as from 3 mL to 300 mL, such as from 4 mL to 200 mL, such as from 5 mL to 150 mL and including from 10 mL to 100 mL.

The container may be formed from any suitable material including, but not limited to, glass, metal or plastic, such as a flexible or rigid plastic, polymeric or thermoplastic materials, e.g., as described above.

In embodiments, containers of the sample input module also include a cap configured to close off the proximal end of the container. For example, the cap may be a screw cap, a snap-on cap or a cap which connects the container by a permanent, semi-permanent or non-permanent adhesive. In certain instances, the cap forms a fluidic seal with the walls of the container. The cap may be an integrated part of the container, including where the cap is molded with, soldered, welded or affixed to the container using a permanent adhesive. In other embodiments, the cap is releasably attached to the container. By "releasably" is meant that the cap can be freely detached from and re-attached to the proximal end of the container. Where the cap is releasably attached to the container, the cap may be non-permanently fastened to the container by any convenient attachment protocol, including but not limited to a hook and loop fastener, a latch, a notch, a groove, a pin, a tether, a hinge, Velcro, non-permanent adhesive, a threaded screw, or a combination thereof. In certain instances, the container includes a threaded outer wall and is screw threaded with the internal walls of the cap.

The cap may include one or more ports into the inner cavity of the container, such as 2 or more ports, such as 3 or more ports, such as 4 or more ports and including 5 or more ports. In certain embodiments, the cap includes two ports. The ports may be any convenient port configured for fluidic or gaseous communication with the inner cavity of the container. In some embodiments, the cap includes a port configured to convey gas into the container to create positive pressure within the container and to convey sample fluid from within the container through a second port to the particle sorting module. In some instances, the container includes a third opening in the cap to allow air to vent.

Any suitable port configuration may be employed depending on the desired function of the port, where examples of ports include channels, orifices, channels having a check valve, a Luer taper fitting, a port with a breakable seal (e.g., single use ports) among other types of ports. In certain embodiments, the port is configured with a Luer taper fitting, such as a Luer-Lok or a Luer-slip. Ports in the cap of the sample input module may be any suitable shape, where cross-sectional shapes of ports of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the ports may vary, in some embodiments ranging from 1 mm to 100 mm, such as from 2 mm to 95 mm, such as from 3 mm to 90 mm, such as from 4 mm to 80 mm, such as from 5 mm to 70 mm, such as from 6 mm to 60 mm and including from 10 mm to 50 mm. In some embodiments, the port is a circular orifice and the diameter of the port ranges from 1 mm to 100 mm, such as from 2 mm to 90 mm, such as from 4 mm to 80 mm, such as from 5 mm to 70 mm, such as from 6 mm to 60 mm and including from 10 mm to 50 mm. Accordingly, depending on the shape of the ports, ports in the cap may have an opening which ranges from 0.01 mm$^2$ to 250 mm$^2$, such as from 0.05 mm$^2$ to 200 mm$^2$, such as from 0.1 mm$^2$ to 150 mm$^2$, such as from 0.5 mm$^2$ to 100 mm$^2$, such as from 1 mm$^2$ to 75 mm$^2$, such as from 2 mm$^2$ to 50 mm$^2$ and including from 5 mm$^2$ to 25 mm$^2$.

Further details sample input modules and systems including the same are described in U.S. application Ser. No. 15/472,020 published as US 2017-0299493; the disclosure of which is herein incorporated by reference.

As summarized above, particle sorting systems of interest also include a waste reservoir fluidically coupled to an outlet from the particle sorting module. In some embodiments, the waste tank includes one or more ports, such as a port for venting accumulated gas pressure in the particle sorting module, a port for collecting waste from the particle sorting module and a port for venting accumulated gas pressure in the waste reservoir or any combination thereof. In some embodiments, the waste reservoir may be in fluid communication with the particle sorting module through one or more ports. For example, the waste reservoir may include 2 or more ports, such as 3 or more ports, such as 4 or more ports and including 5 or more ports. In certain embodiments, the waste reservoir includes two ports. The ports may be any convenient port configured for fluidic or gaseous communication with the inner cavity of the waste reservoir. In some embodiments, the waste reservoir includes a port that is configured to vent (i.e., release) accumulated gas pressure from within the waste reservoir. In other embodiments, the waste reservoir includes a port that receives waste fluid from the particle sorting module. In yet other embodiments, the waste reservoir includes a port that is configured to vent accumulated gas pressure from within the particle sorting module, such as venting the flow cell portion of the particle sorting module.

Any suitable port configuration may be employed depending on the desired function of the port, where examples of ports include channels, orifices, channels having a check valve, a Luer taper fitting, a port with a breakable seal (e.g., single use ports) among other types of ports. In certain embodiments, the port is configured with a Luer taper fitting, such as a Luer-Lok or a Luer-slip. Ports in the waste tank may be any suitable shape, where cross-sectional shapes of ports of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the ports may vary, in some embodiments ranging from 1 mm to 100 mm, such as from 2 mm to 95 mm, such as from 3 mm to 90 mm, such as from 4 mm to 80 mm, such as from 5 mm to 70 mm, such as from 6 mm to 60 mm and including from 10 mm to 50 mm. In some embodiments, the port is a circular orifice and the diameter of the port ranges from 1 mm to 100 mm, such as from 2 mm to 90 mm, such as from 4 mm to 80 mm, such as from 5 mm to 70 mm, such as from 6 mm to 60 mm and including from 10 mm to 50 mm. Accordingly, depending on the shape of the ports, ports in the waste tank may have an opening which ranges from 0.01 mm$^2$ to 250 mm$^2$, such as from 0.05 mm$^2$ to 200 mm$^2$, such as from 0.1 mm$^2$ to 150 mm$^2$, such as from 0.5 mm$^2$ to 100 mm$^2$, such as from 1 mm$^2$ to 75 mm$^2$, such as from 2 mm$^2$ to 50 mm$^2$ and including from 5 mm$^2$ to 25 mm$^2$.

In some embodiments, the waste reservoir may be fluidically coupled to the particle sorting module through one or more conduits. For example, the particle sorting module may be fluidically coupled to the waste reservoir through 2 or more conduits, such as 3 or more conduits and including through 5 or more conduits. Conduits which couple the particle sorting module to the waste tank include a proximal end connected to the particle sorting module and a distal end connected to the waste tank.

Each conduit may have a length that varies and independently, each conduit may be 5 cm or more, such as 7 cm or more, such as 10 cm or more, such as 25 cm or more, such as 30 cm or more, such as 50 cm or more, such as 75 cm or more, such as 100 cm or more, such as 250 cm or more and including 500 cm or more. The lumen diameter of each conduit may also vary and may be 0.5 mm or more, such as 0.75 mm or more, such as 1 mm or more, such as 1.5 mm or more, such as 2 mm or more, such as 5 mm or more, such as 10 mm or more, such as 25 mm or more and including 50 mm or more. For example, the lumen diameter may range from 0.5 mm to 50 cm, such as from 1 mm to 25 mm and including from 5 mm to 15 mm.

Each conduit may be formed from a thin material, such as where the walls of the conduit have a thickness of 5 mm or less, such as 3 mm or less, such as 2 mm or less, including 1 mm or less, or 0.5 mm or less, such as 0.4 mm or less, such as 0.3 mm or less, such as 0.2 mm or less and including 0.1 mm or less. In certain embodiments, the conduit is formed from a flexible material having a Young's modulus of 1 GPa or less, such as 0.9 GPa or less, such as 0.8 GPa or less, such as 0.7 GPa or less, such as 0.6 GPa or less, such as 0.5 GPa or less, such as 0.4 GPa or less, such as 0.3 GPa or less, such as 0.2 GPa or less, such as 0.1 GPa or less and including 0.01 GPa or less. In certain embodiments, the conduits are formed from a polymeric material, such as, but not limited to, e.g., as described above, including but not limited to: polyvinyl chloride (PVC), ethyl vinyl acetate (EVA), polyethylene, polypropylene, combinations thereof, and the like.

The waste reservoir may include one or more chambers. In some embodiments, the waste reservoir has a single chamber for collecting all discarded components from the particle sorting module. In other embodiments, the waste reservoir has more than one chamber, such as 2 or more chambers, such as 3 or more chambers and including 4 or more chambers. Each chamber in a multi-chamber waste tank may have one or more inlet and outlet conduits. For instance, the two or more chambers may be in fluid communication with a single conduit. The lumens of the two or more chambers may be joined together at a Y-connector, a valve (e.g., a pinch valve), or the like.

Where the waste reservoir includes more than one chamber, each different chamber may be configured to receive the same or different fluids. For example, a first waste tank chamber may collect and contain uncharged and undeflected particles from the flow stream and a second waste tank chamber may collect and contain deflected, but uncollected particles from the flow stream. In other embodiments, a first waste tank chamber may collect and contain excess sheath fluid and discarded excess sample fluid from the flow stream and a second waste tank chamber may collect a sorted, but undesirable component of the sample fluid from the flow stream.

In some embodiments, the waste reservoir includes one or more ports, such as a port for venting accumulated gas pressure in the particle sorting module, a port for collecting waste from the particle sorting module and a port for venting accumulated gas pressure in the waste tank or any combination thereof. The waste stream from the particle sorting module may be conveyed to the waste tank through a conduit. The conduit may be coupled to the waste tank with a connector, such as a Luek-Lok connector or a screw fit connector.

Further details regarding waste reservoirs and systems including the same are described in U.S. application Ser. No. 15/472,020 published as US 2017-0299493; the disclosure of which is herein incorporated by reference.

Particle sorting systems according to certain embodiments also include a sheath fluid delivery subsystem for conveying sheath fluid to the flow cell nozzle of the enclosed particle sorting module. The term "sheath fluid" is used herein in its conventional sense to refer to fluid conveyed through a conduit (e.g., in a flow cytometer) that is used to form an annular flow coaxial with a sample-containing fluid creating a hydrodynamically focused flow of particle-containing sample fluid in the center of the sheath fluid stream. Sheath fluids of interest may be any convenient buffered composition, such as for use in a flow cytometer and may include one or more salts, including but not limited to potassium phosphate, potassium chloride, sodium phosphate, sodium chloride, preservatives as well as chelating agents, such as disodium ethylenediaminetetraacetic acid (EDTA). In embodiments, the sheath fluid dispensing system includes a fluid reservoir containing a sheath fluid, a conduit having a proximal end in fluid communication with the sheath fluid reservoir and a distal end in fluid communication with a sheath fluid input to the particle sorting module.

In some embodiments, the sheath fluid delivery subsystem includes a pressurized housing with pliant container having a reservoir for sheath fluid positioned within the housing. In other embodiments, the sheath fluid delivery subsystem includes a housing and a first pliant container and a second pliant container positioned in the housing. The first pliant container includes a fluid reservoir and a conduit having a proximal end and a distal end, where the proximal end is fluidically coupled to the fluid reservoir and the distal end is configured for coupling the conduit to the particle sorting module and the second pliant container includes a gas reservoir and a port in gaseous communication with the gas reservoir. In these embodiments, the second pliant container is positioned in the housing with the first pliant container and is configured to apply pressure to the fluid reservoir of the first pliant container to convey sheath fluid from the distal end of the conduit into the particle sorting module.

In certain embodiments, particle sorting systems of interest include a sheath fluid delivery subsystem for conveying sheath fluid to the particle sorting module, such as those described in co-pending PCT Patent Application No. PCT/US2016/048433 filed on Oct. 24, 2016 and published as WO 2017/040151; and U.S. patent application Ser. No. 14/365,602 now issued as U.S. Pat. No. 9,551,643, the disclosures of which are herein incorporated by reference in their entireties. Further details regarding sheath fluid delivery subsystems and systems including the same are described in U.S. application Ser. No. 15/472,020 published as US 2017-0299493; the disclosure of which is herein incorporated by reference.

As mentioned above, any of the fluidic connections with respect to the sorting module, e.g., within the sorting module and/or between the sorting module and other aspects of the systems, e.g., receiving containers (such as bags), input tubes, etc., may be made using sterile tube welding, as desired. Any convenient sterile tube welding system and materials may be employed.

As summarized above, systems of the invention are configured to control aerosol content in the enclosed particle sorting module or at least a region thereof, such as the sort chamber. In some embodiments, the system is configured to reduce aerosol production in the sort chamber. By "reduce aerosol production" is meant that, as compared to a suitable control, such as a device described in U.S. application Ser. No. 15/472,020 published as US 2017-0299493, aerosol production is diminished by 2-fold or more, such as 5-fold or more, including 10-fold or more.

Aerosol production may be reduced using one or more aerosol reduction approaches, such as described below. In some instances, the enclosed particle sorting module is configured to minimize contact of the waste stream with an internal surface of the particle sorting module. In these instances, the internal configuration or design of the enclosed particle sorting module, including the sort chamber thereof, is chosen or fabricated so that the waste stream, and in some instances the sorted stream, does not contact a solid surface thereof. In some instances, the particular sorting module is configured such that the waste stream exits through a first outlet, i.e., an outlet fluidically coupling the sort chamber with a waste reservoir, without contacting a wall of the first outlet. For example, the outlet may be axially aligned with the longitudinal axis of the waste stream, such that the waste stream passes through the center of the outlet upon passing through the outlet. The dimensions of the outlet in such instances may vary, where the diameter of the outlet ranges in some instances from 2.5 to 25 mm, such as from 5 to 10 mm. In some instance, the waste reservoir is fluidically coupled to the first outlet by flexible line, e.g., as described above. While the dimensions of the flexible line may vary, in some instances the inner diameter of the flexible line ranges from 2.5 to 25 mm, such as from 5 to 10 mm. Where desired, the flexible line is configured such that the waste stream first contacts an inner wall of the flexible line at a predetermined distance from the outlet. While this distance may vary, the distance may be chosen to reduce the chances of aerosol droplets formed by contact from moving back into the sort chamber. In some instances, the longitudinal axis of the flexible line aligns with the center of the outlet for a distance of 5 mm or longer, such as 10 mm or longer, including 25 mm or longer, including 50 mm or longer. In order to minimize aerosol production, in some instances flexible line is configured such that the waste stream first contacts an inner wall of the flexible line at shallow angle. While the contact angle may vary in such instances, in certain embodiments the contact angle ranges from 0.5 to 25°, such as 0.5 to 15° and including 0.5 to 5°.

Alternatively or in addition to reducing aerosol formation via proper configuration of the sort chamber and/or waste line, e.g., as described above, flow cytometer systems of the invention may be configured to maintain a temperature above dew point in the sort chamber of the enclosed particle sorting module. The dew point is used herein in its conventional sense to refer to the temperature (varying according to pressure and humidity) below which water droplets begin to condense and dew can form. The systems may be configured to provide a dew point in the sort chamber that ranges from 1 to 30° C., such as 2 to 25° C. and including 3 to 15° C. The systems of the invention may be configured to maintain temperature of the sort chamber above the dew point using a variety of different approaches. In some instances, the systems include a heater configured to maintain the temperature above the dew point. The heater may be any convenient type of heater, such as a restive heater, visible radiation heater, infrared radiation heater, etc. Resistive heaters of interest include, but are not limited to, those having metal heating elements, ceramic heating elements, polymeric PTC heating elements, combination heating elements, composite heating elements, and the like. The heating element may be configured such that it provides for radiant heating of the sort chamber of the enclosed particle sorting module. The heating element(s) may be integrated into the flow cytometer system and/or the enclosed particle sorting module, as desired. As such, in some instances the heating element(s) is an integrated part of the flow cytometer system, and is not part of the enclosed particle sorting module. In other instances the heating element(s) is integrated in the enclosed particle sorting module. A given heater may be made up of a single heating element or two or more heating elements, as desired. In some instances, the heating element is configured to provide a temperature in the sort chamber of the enclosed particle sorting module that ranges from 5 to 40° C., such as 10 to 35° C. and including 15 to 30° C.

In addition to or alternatively, the flow cytometer may be configured to control humidity in the sort chamber. In such instances, the flow cytometer may be configured to provide a relative humidity in the sort chamber that is less 75%, such as less than 60% including less then 50%, where in some instances the provided relative humidity may range from 1 to 50%, such as 5 to 25%, including 5 to 15%. The humidity of the sort chamber may be controlled using any convenient approach. In some instances, the system includes a closed recirculating gasflow between the sort chamber and the waste reservoir. By closed recirculating gasflow is meant that a recirculating gas line that is not open to the external environment is provided between the waste reservoir and the enclosed particle sorting module, such that gas, e.g., air, may be circulated between the interior of the waste reservoir and the interior of the enclosed particle sort chamber without being contaminated by the external environment. The closed recirculating gasflow is made up of one or more distinct fluidic lines, e.g., as described above, which connect the interiors of the waste reservoir and the enclosed particle sorting module. The rate of gas flow through the closed recirculating gasflow may vary, and in some instances ranges from 5 to 500 mL/min, such as 10 to 200 mL/min. The desired airflow may be provided using any convenient approach, where in some instances the desired airflow is provided using a pump, such as a peristaltic pump. Where desired, the recirculating gas flow may include a desiccant, e.g., positioned at one or more regions or locations of the closed recirculating gasflow. Any convenient desiccant may be employed, such as but not limited to: dried clay materials, e.g., Montmorillonite clay, silica gels, etc.

As summarized above, the subject systems are configured for sorting particle components of a sample, such as a biological sample. In some embodiments, systems further include a light detection system configured to irradiate and identify particle components of a sample in a flow stream. In these embodiments, systems include one or more light sources for irradiating a sample in a flow stream. The light source may be a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

The subject systems may include one or more light sources, as desired, such as two or more light sources, such as three or more light sources, such as four or more light sources, such as five or more light sources and including ten or more light sources. The light source may include any combination of types of light sources. For example, in some embodiments, the subject systems include an array of lasers, such as an array having one or more gas lasers, one or more dye lasers and one or more solid-state lasers. In other instances, where two lights sources are employed, a first light source may be a broadband white light source (e.g., broadband white light LED) and second light source may be a broadband near-infrared light source (e.g., broadband near-IR LED). In other instances, where two light sources are employed, a first light source may be a broadband white light source (e.g., broadband white light LED) and the second light source may be a narrow spectra light source (e.g., near-IR LED or laser). In yet other instances, the light source is a plurality of narrow band light sources each emitting specific wavelengths, such as two or more lasers, such as three or more lasers including 5 or more lasers. In still other instances, the light source is an array of two or more LEDs, such as an array of three or more LEDs, such as an array of five or more LEDs, including an array of ten or more LEDs.

In some embodiments, light sources emit light having wavelengths ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a plurality of narrow band light sources emitting wavelengths ranging from 200 nm to 900 nm. For example, the light source may be plurality of narrow band LEDs (1 nm-25 nm) each independently emitting light having a range of wavelengths between 200 nm to 900 nm. In some embodiments, the narrow band light source is one or more narrow band lamps emitting light in the range of 200 nm to 900 nm, such as a narrow band cadmium lamp, cesium lamp, helium lamp, mercury lamp, mercury-cadmium lamp, potassium lamp, sodium lamp, neon lamp, zinc lamp or any combination thereof. In other embodiments, the narrow band light source includes one or more lasers emitting light in the range of 200 nm to 1000 nm, such as gas lasers, excimer lasers, dye lasers, metal vapor lasers and solid-state laser as described above.

The light source may be positioned at an angle with respect to the flow stream which ranges from 10° to 90°, such as from 15° to 85°, such as from 20° to 80°, such as from 25° to 75° and including from 30° to 60°. In certain embodiments, the light source is positioned at a 90° angle with respect to the sample.

In these embodiments, systems of interest also include one or more detectors for detecting and measuring light from the flow stream. Detectors of interest may include, but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the transmitted light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera. Where the fluorescent or scattered light is measured with a CCD, the active detecting surface area of the CCD may vary, such as from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$. The number of photodetectors in the subject systems may vary, as desired, such as 1 or more, such as 2 or more, such as 3 or more, such as 5 or more and including 10 or more photodetectors. Where the subject systems include more than one photodetector, each photodetector may be the same, or the collection of two or more photodetectors may be a combination of different photodetectors.

The detector may be positioned at a distance from the flow stream depending on the type of irradiating light source and characteristics of the sample (e.g., particle sizes in the sample). For example, the detector may be positioned 0.01 mm or more from the sample, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the sample. The detector may also be positioned at an angle with respect to the sample which varies. For example, the detector may be positioned at an angle with respect to the flow stream which ranges from 10° to 90°, such as from 15° to 85°, such as from 20° to 80°, such as from 25° to 75° and including from 30° to 60°. In certain embodiments, the detector is positioned at a 90° angle with respect to the flow stream. In some embodiments, systems include a detector that is positioned to detect forward scattered light from the flow stream. In other embodiments, systems include a detector that is positioned to detect side scattered light from the flow stream. In yet other embodiments, systems include a detector that is positioned to detect fluorescence from the flow stream.

Further details regarding flow cytometer systems and components thereof are described in U.S. application Ser. No. 15/472,020 published as US 2017-0299493; the disclosure of which is herein incorporated by reference.

Figure 2:
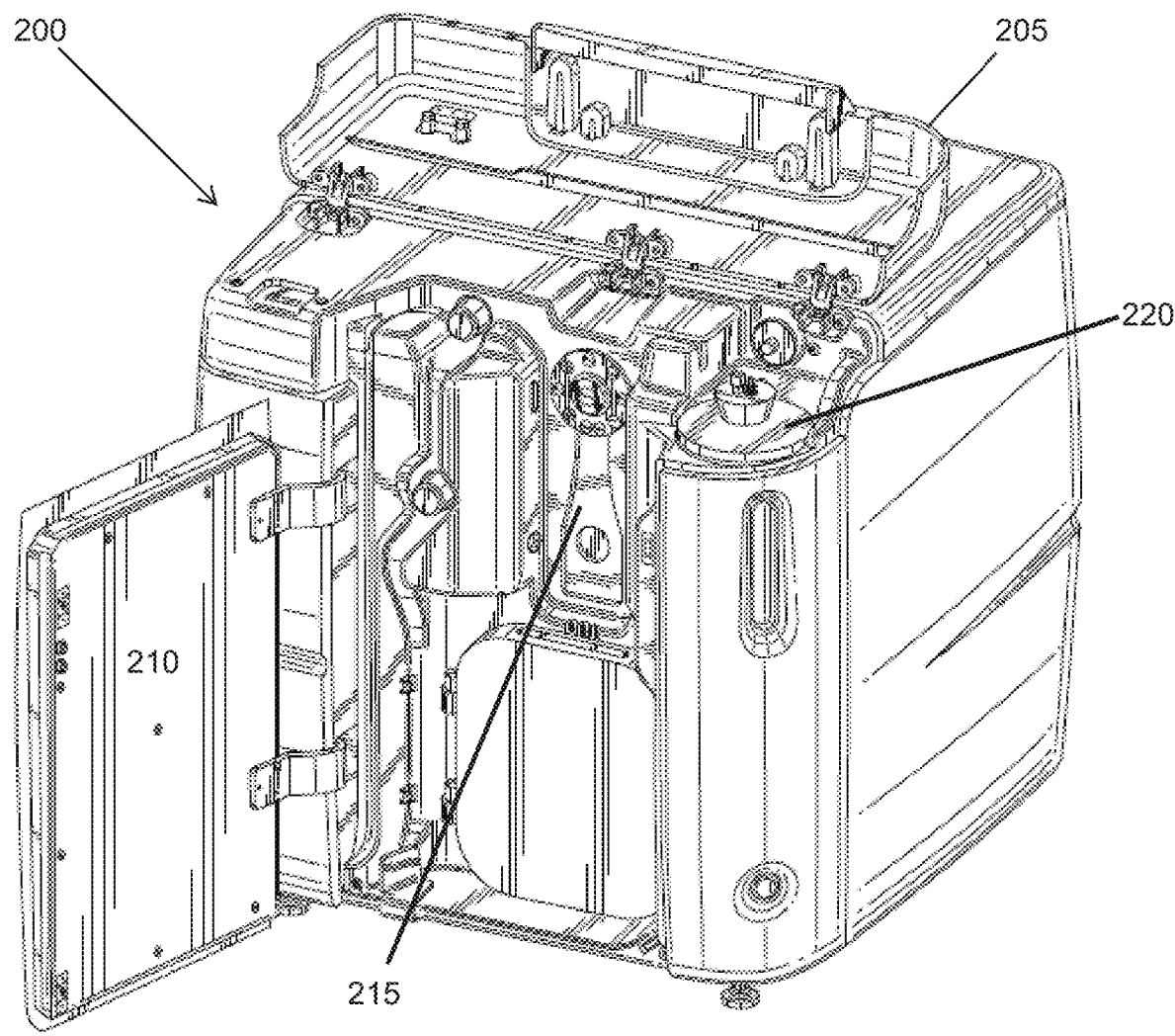
FIG. 2 provides an illustration of a flow cytometer system to which an enclosed particle sorting module as illustrated in FIG. 1 may be coupled to make a sterile flow cytometer cell sorter, in accordance with an embodiment of the invention.

FIG. 2 provides an illustration of a flow cytometer system that is configured to be operably engaged to an enclosed particle sorting module as illustrated in FIG. 1 to produce a sterile flow cytometer cell sorter. As shown in FIG. 2, system 200 includes doors 205 and 210 which open to reveal a location 215 to which an enclosed particle sorting module may be operably engaged. Also shown is sample input module 220.

Figure 3:
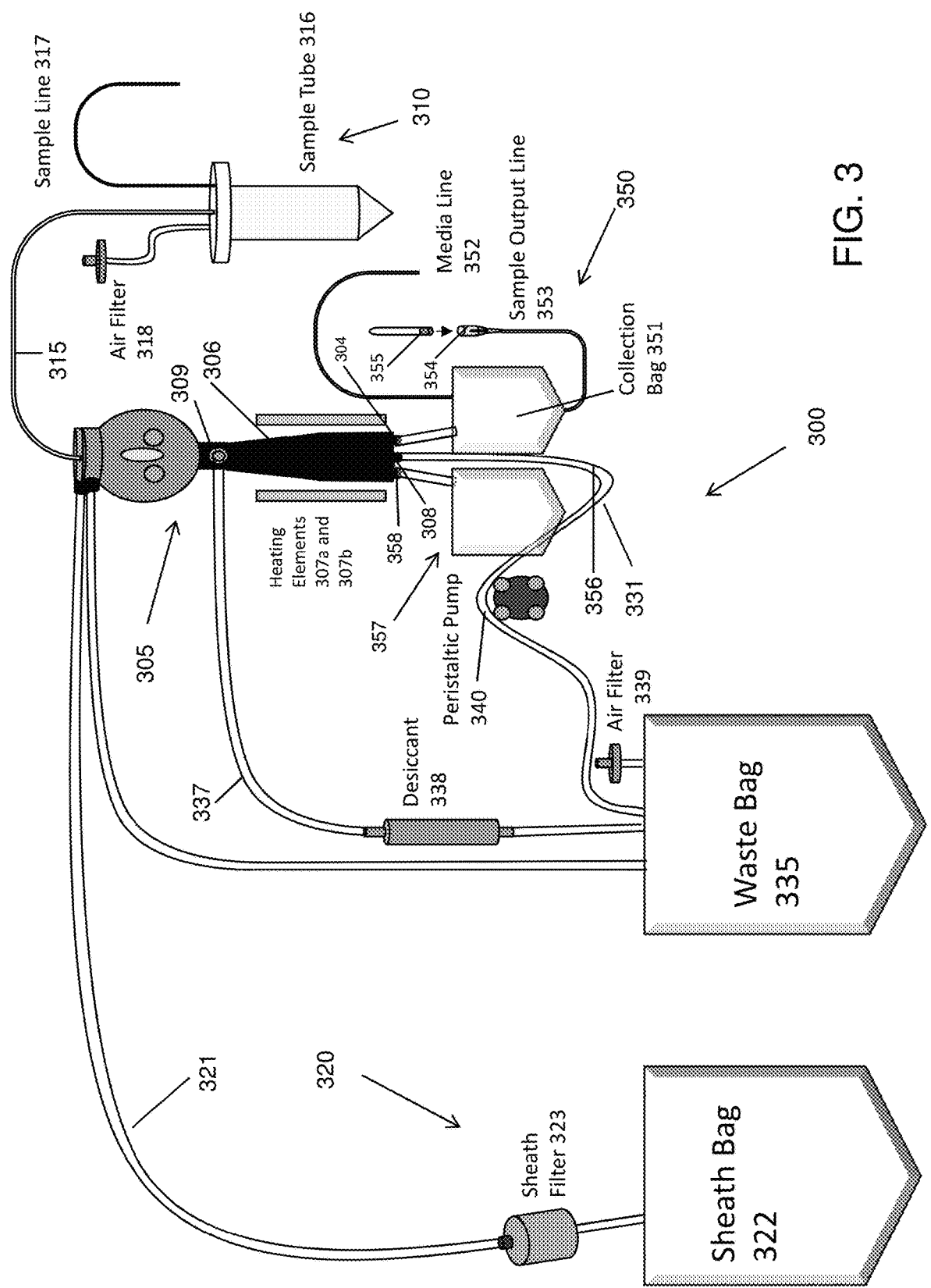
FIG. 3 provides a schematic illustration of a flow cytometer cell sorter according to an embodiment of the invention.

FIG. 3 provides a schematic illustration of a flow cytometer cell sorter according to an embodiment of the invention. As illustrated in FIG. 3, cell sorter 300 includes an enclosed particle sorting module 305 operably coupled to a sample input module 310 by line 315, where the sample input module 310 includes sample tube 316, sample line 317 and air filter 318. Enclosed particle sorting module 305 is also coupled to a sheath fluid sub-system 320 by sheath fluid line 321, where the sheath fluid subsystem includes a sheath bag 322 holding a quantity of sheath fluid and a sheath filter 323. Proximal to, and in radiant heating relationship with, the sort chamber 306 are heating elements 307a and 307b. A first central output 308 of the sort chamber is axially aligned with a waste stream and fluidically connects to a waste reservoir by line 331.

For a substantial distance from the output 308, the longitudinal axis of line 331 is aligned with the center of output 308 so that the waste stream does not contact an internal wall 356 of line 331 at location proximal to the sort the chamber. Furthermore, line 331 makes a gradual bend at a distance far from output 308 so that when waste stream does contact an internal wall, it does so at a shallow angle in order to minimize aerosol formation. In order to provide adequate airflow to achieve a desired low humidity in the sort chamber, line 331 is a component of a closed recirculating gas flow which also includes waste bag 335 and return line 337, which return line 337 provides for gaseous communication between the waste bag 335 and the sort chamber by connecting with the sort chamber at entry location 309. Return line 337 includes desiccant chamber 338 which removes water vapor from the gas prior to its reintroduction into the sort chamber via entry location 309. Also shown is air filter 339. To provide for the desired air flow in the closed recirculating gas flow, peristaltic pump 340 is provided. A sorted particle collection system 350 is shown in particle receiving relationship with sorted particle output 304 of the enclosed particle sorting module. Sorted particle collection system 350 includes collection bag 351, media input line 352, sample output 353 having a mating element 354, and VACUTAINER® blood collection tube 355.

A second collection system 357 is shown fluidically coupled to a third outlet 358 of the enclosed particle sorting module. The second collection system 357 includes a collection bag having a sort tube in droplet receiving relationship with the third outlet 358.

Methods for Sorting Particle Components of a Sample in a Flow Stream

Aspects of the disclosure also include methods for sorting particles of a sample, such as cells in a biological sample. Methods according to certain embodiments include irradiating a sample containing particles in a flow stream in an interrogation region of a particle sorting module, detecting light (e.g., fluorescent light) from the sample, and sorting the particles of the sample into two or more sample collection containers. In certain embodiments, the sample is a biological sample and methods include sorting and collecting two or more different types of cells.

In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchioalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for separation from the flow stream according to a variety of parameters, such as a phenotypic characteristic identified via the attachment of a particular fluorescent label to cells of interest. In some embodiments, the system is configured to deflect analyzed droplets that are determined to include a target cell. A variety of cells may be targeted for sorting using the subject methods. Target cells of interest include, but are not limited to, stem cells, T cells, dendritic cells, B Cells, granulocytes, leukemia cells, lymphoma cells, virus cells (e.g., HIV cells) NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoetic progenitor cells (CD34+) from whole blood, bone marrow or cord blood.

In practicing the subject methods, a particle sorting module is coupled to a particle sorting system. To couple the particle sorting module to the particle sorting system, aligners on the outer wall of the particle sorting module housing are placed into contact with aligners on the register of the particle sorting system. When present, one or more fasteners may be engaged when the aligners on the outer wall of the particle sorting module housing are contacted with the aligners of the particle sorting system register to affix the particle sorting module to the particle sorting system. Depending on the sample being analyzed, the particle sorting module may be maintained in contact with the particle sorting system for any desired duration, such as for 1 minute or longer, such as 2 minutes or longer, such as 5 minutes or longer, such as 10 minutes or longer, such as 30 minutes or longer, such as 60 minutes or longer, such as 120 minutes or longer, such as 240 minutes or longer and including 480 minutes or longer.

After coupling the particle sorting module to the particle sorting system, an amount of a fluidic sample is injected into the particle sorting module. The amount of sample injected into the particle sorting module may vary, for example, ranging from 0.001 mL to 1000 mL, such as from 0.005 mL to 900 mL, such as from 0.01 mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and sorting labeled particles (e.g., target cells) in a sample. In practicing the subject methods, the fluidic sample including the particles is first introduced into the particle sorting module flow nozzle. Upon exit from the flow nozzle, the particles are passed substantially one at a time through the sample interrogation region where each of the particles is irradiated to a source of light and measurements of light scatter parameters and fluorescent emissions as desired (e.g., two or more light scatter parameters and measurements of one or more fluorescent emissions) are separately recorded for each particle. The particles are passed in the flow stream substantially one at a time in a flow path through the sample interrogation region in the particle sorting module where each particle is illuminated by a light source. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In certain embodiments, methods including irradiating the flow stream at or near the flow cell nozzle orifice. For example, methods may include irradiating the flow stream at a position about 0.001 mm or more from the nozzle orifice, such as 0.005 mm or more, such as 0.01 mm or more, such as 0.05 mm or more, such as 0.1 mm or more, such as 0.5 mm or more and including 1 mm or more from the nozzle orifice. In certain embodiments, methods include irradiating the flow stream immediately adjacent to the flow cell nozzle orifice.

In series with a sensing region, detectors, such as photo-multiplier tubes (or "PMT"), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (or FSC), orthogonal light scatter (SSC), and fluorescence emissions (FL1, FL2, etc.) include a separate parameter for each particle (or each "event"). Thus, for example, two, three or four parameters can be collected (and recorded) from a particle labeled with two different fluorescence markers.

As described above, suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD). Where the light from the irradiated flow stream at the sample interrogation region of the particle sorting module is measured with a CCD, the active detecting surface area of the CCD may vary, such as from 0.01 $cm^2$ to 10 $cm^2$, such as from 0.05 $cm^2$ to 9 $cm^2$, such as, such as from 0.1 $cm^2$ to 8 $cm^2$, such as from 0.5 $cm^2$ to 7 $cm^2$ and including from 1 $cm^2$ to 5 $cm^2$.

The data recorded for each particle is analyzed in real time or stored in a data storage and analysis means, such as a computer, as desired. U.S. Pat. No. 4,284,412 describes the configuration and use of a flow cytometer of interest equipped with a single light source while U.S. Pat. No. 4,727,020 describes the configuration and use of a flow cytometer equipped with two light sources.

In embodiments of the present disclosure according to certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

Methods in certain embodiment also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In certain embodiments, the system operates to determine a timeslot during which one or more containers at the distal end of the particle sorting module are aligned with the deflected droplet receiving location. In some instances, the deflection signal includes an initial deflection sub-signal and a final deflection sub-signal; and the system operates to produce the deflection signal by sending an initial deflection sub-signal at the beginning of the timeslot that configures the deflector to deflect an analyzed droplet, when present. In certain cases, methods include sending a final deflection sub-signal to the particle sorting module at the end of the timeslot that configures the deflector not to deflect an analyzed droplet. In some embodiments, methods include sending a final deflection sub-signal to the particle sorting module after a single analyzed droplet has been deflected during the timeslot, where the final deflection sub-signal configures the deflector not to deflect an analyzed droplet.

In some instances, the methods may include maintaining a desired temperature in the sort chamber of the sorting module. For example, the methods may include operating one or more heating elements, which may be integrated with the system or module, to maintain a desired temperature in the sort chamber, e.g., as described above, where the desired temperature may be above a dew point in the sort chamber.

In some embodiments, methods include detaching the particle sorting module from the particle sorting system by disengaging the aligners (and where present, fasteners) to detach the particle sorting module from the particle sorting system. In some instances, methods further include reattaching a second particle sorting module to the particle sorting system after the first particle sorting module has been removed. The first particle sorting module may be washed and sterilized for subsequent use (e.g., with an autoclave) or may be discarded. As such, in some embodiments, particle sorting modules as described herein are disposable, such as after a single use.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a sample in a flow stream in the sample interrogation region of a particle sorting module; algorithm for detecting light from the sample and measuring the detected light at one or more wavelengths and algorithm for sorting particles in the sample into two or more sample collection containers.

In embodiments, the system includes an input module, a processing module and an output module. In some embodiments, the subject systems may include an input module such that parameters or information about each fluidic sample, intensity and wavelengths (discrete or ranges) of the applied light source, properties of the particle sorting module including flow cell nozzle chamber size, nozzle orifice size, dimensions of sample interrogation region of the particle sorting module, the applied voltage of the deflection plates, position of containers at the distal end of the particle sorting module, duration of irradiation by the light source, number of different light sources, distance from light source to the flow stream in the sample interrogation region of the particle sorting module, focal length of any optical adjustment components, refractive index of flow stream medium (e.g., sheath fluid), presence of any wavelength separators, properties of wavelength separators including bandpass width, opacity, grating spacting as well as properties and sensitivity of photodetectors.

The processing module includes memory having a plurality of instructions for performing the steps of the subject methods, such as irradiating a sample in a flow stream in the sample interrogation region of a particle sorting module; detecting light from the sample in the flow stream, measuring the detected light at one or more wavelengths and sorting particles in the sample into two or more sample collection containers positioned at the distal end of the particle sorting module.

After the processing module has performed one or more of the steps of the subject methods, an output module communicates the results to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods, such as irradiating a sample in a flow stream in the sample interrogation region of a particle sorting module; detecting light from the sample in the flow stream, measuring the detected light at one or more wavelengths and sorting particles in the sample into two or more sample collection containers positioned at the distal end of the particle sorting module.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction therewith, in managing the treatment of a health condition, such as HIV, AIDS or anemia.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Kits

Aspects of the invention further include kits, where kits include one or more enclosed particle sorting modules, e.g., as described herein. In some embodiments, the kits also include one or more sample input modules and one or more waste reservoirs, e.g., bags. Kits can also include one or more conduits for fluidically coupling the sample input module and waste tank to the particle sorting module. In some instances, kits also include connectors for coupling components of the subject systems together, such as connectors for coupling the sample input module to the particle sorting module, connectors for coupling the waste tank to the particle sorting module as well as connectors for coupling a sheath fluid delivery subsystem to the particle sorting module. Kits may include connectors such as Luer-lok connectors, screw-fit connectors as well as connector which join two components with a breakable seal. The kits may include one or more sorted particle receiving containers, such as a sorted particle collection component, as well as components thereof, e.g., evacuated receiving containers, such as described above. In certain instances, kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., particle sorting module, sample input module and waste tank, are present in a sealed pouch, e.g., a sterile packaging, such as a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject particle sorting modules, particle sorting systems, methods and computer systems find use in a variety of applications where it is desirable to analyze and sort particle components in a sample in a fluid medium, such as a biological sample. Embodiments of the invention also find use in providing increased sterility to particle sorting systems which enhances collection of samples of greater purity as well as reduces incidences of cross-contamination between analyzed samples, such as in research and high throughput laboratory testing. Embodiments of the invention also find use where it is desirable to provide a flow cytometer with improved cell sorting accuracy, enhanced particle collection, particle charging efficiency, more accurate particle charging and enhanced particle deflection during cell sorting.

Embodiments of the invention also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Embodiments of the invention provide for closed sorting devices and methods, which may reduce, if not eliminate, one or more of: risk of contamination of the sample be processed; risk of exposure of operators to sample components, which may be important in situations where biohazardous samples are being processed; etc.

The flow cytometrically sorted samples produced using systems and methods as described here may be administered to a subject in a cell therapy protocol or any application where the infusion of a sterile volume of live cells into a subject is desired. Conditions that may be treated by the administration of the flow cytometrically sorted sample include, but are not limited to, blood disorders, immune system disorders, organ damage, etc.

As such, the systems and methods described herein may find use in cell therapy protocols. A cell therapy protocol is a protocol in which viable cellular material including, e.g., cells and tissues, may be prepared and introduced into a subject as a therapeutic treatment. A typical cell therapy protocol may include the following steps: sample collection, cell isolation, genetic modification, culture and expansion in vitro, cell harvesting, sample volume reduction and washing, biopreservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of flow cytometrically processing a sample, the method comprising:
   introducing a particulate sample into an enclosed particle sorting module of a flow cytometer comprising:
      an enclosed particle sorting module having a sort chamber comprising a droplet deflector;
      a sample input module fluidically coupled to the enclosed particle sorting module;
      a waste reservoir fluidically coupled to first outlet of the enclosed particle sorting module;
      a closed recirculating gasflow between the sort chamber and the waste reservoir; and
      a first sorted particle collection system fluidically coupled to a second outlet of the enclosed particle sorting module;
      wherein the flow cytometer is configured to control aerosol content in the sort chamber; and
   sorting the introduced particulate sample.

2. The method according to claim 1, wherein the method comprises maintaining a temperature above dew point in the sort chamber.

3. The method according to claim 1, wherein the particles are cells.

4. The method according to claim 1, wherein the method is performed under sterile conditions.

5. The method according to claim 1, wherein the closed recirculating gas flow comprises a desiccant.

6. A particle sorting module comprising:
   a sort chamber, the sort chamber comprising:
      droplet deflector a first outlet configured to fluidically connect a waste stream to a waste reservoir via a waste line, wherein the first outlet is configured to be axially aligned with the waste stream; and a second outlet configured to fluidically couple sorted particles to a collection system;

wherein the particle sorting module is configured to control aerosol content in the sort chamber by minimizing contact of the waste stream with a wall of the first outlet.

7. The particle sorting module according to claim 6, wherein the first outlet has a diameter ranging from 5 to 10 mm.

8. The particle sorting module according to claim 6, wherein the enclosed particle sorting module further comprises a heater.

9. The particle sorting module according to claim 6, wherein the particle sorting module further comprises an aligner.

10. The particle sorting module according to claim 6, wherein the module is sterile.

11. A kit comprising:

a particle sorting module according to claim 6; and sterile packaging for the enclosed particle sorting module.

12. The kit according to claim 11, wherein the kit further comprises a sorted particle collection system.

13. The kit according to claim 12, wherein the sorted particle collection system comprises:

(a) a collection container having a sort tube in droplet receiving relationship with the second outlet; and (b) a sample output operatively coupling a cell collection location of the collection container to a mating connection for an evacuated receiving container.

14. The kit according to claim 13, wherein the kit further comprises an evacuated receiving container.

* * * * *